No. 896,608. PATENTED AUG. 18, 1908.
H. AST.
ARRANGEMENT OF THE WINDING OF ELECTROMAGNETIC CLUTCHES.
APPLICATION FILED JUNE 15, 1906.
2 SHEETS—SHEET 1.
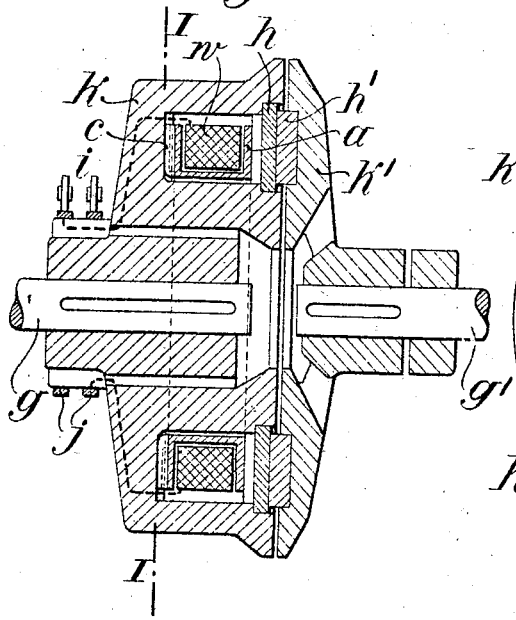
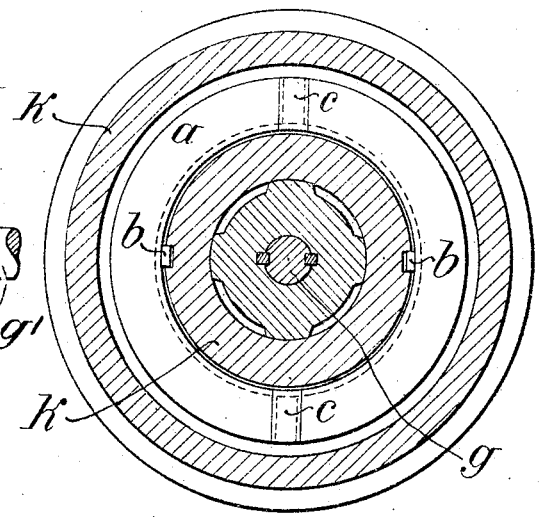
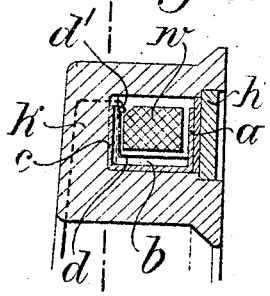
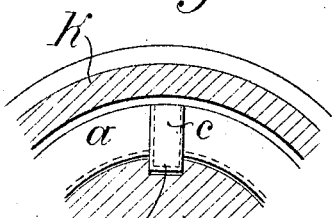
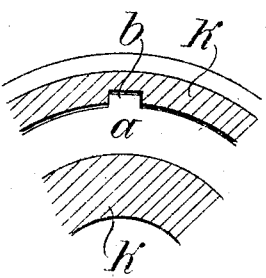
WITNESSES:
Friedrich Correll
Sally O. Yudzky
Heinrich Ast INVENTOR
BY  ATTORNEY.

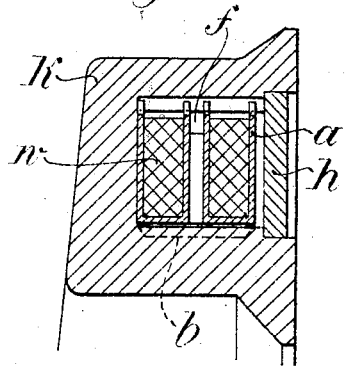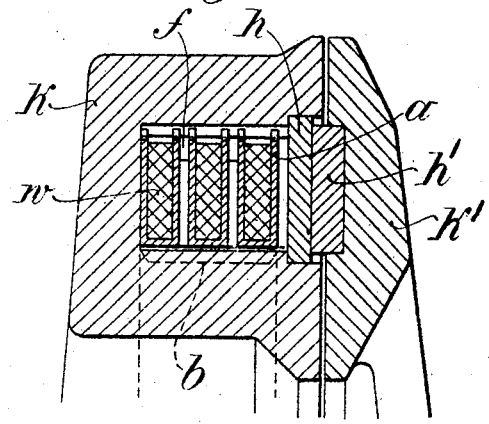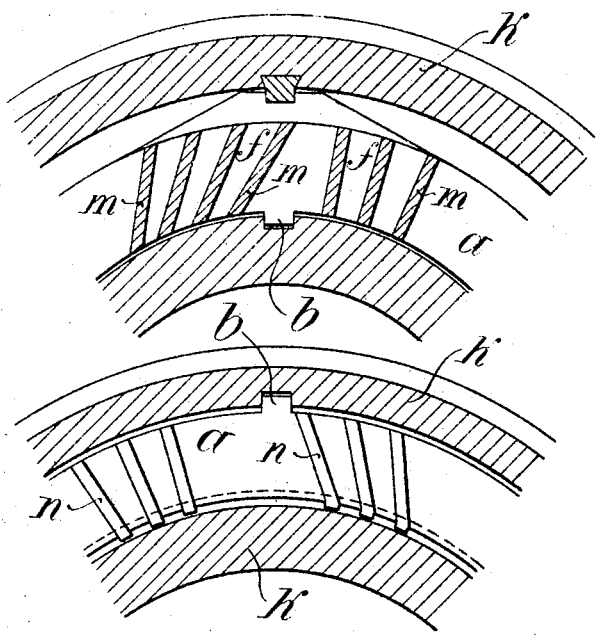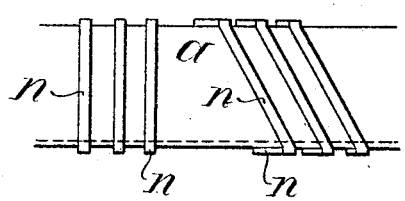

UNITED STATES PATENT OFFICE.

HEINRICH AST, OF VIENNA, AUSTRIA-HUNGARY, ASSIGNOR TO THE FIRM OF VULKAN MASCHINENFABRIKS-ACTIEN-GESELLSCHAFT, OF VIENNA, AUSTRIA-HUNGARY.

ARRANGEMENT OF THE WINDING OF ELECTROMAGNETIC CLUTCHES.

No. 896,608.      Specification of Letters Patent.      Patented Aug. 18, 1908.

Application filed June 15, 1906. Serial No. 321,869.

*To all whom it may concern:*

Be it known that I, HEINRICH AST, subject of the Emperor of Austria-Hungary, residing at Vienna, Austria-Hungary, have invented certain new and useful Improvements in the Arrangement of the Winding of Electromagnetic Clutches, of which the following is a specification.

In electromagnetic clutches which are often thrown into and out of operation, or which are of large dimensions, inconvenience arises in consequence of the inertia causing the windings to change their positions in the magnet body through the twisting or relative angular movement thereof, and therefore the ends of the windings tear and the insulation becomes damaged. Moreover when the heat produced in the interior of the windings by the electric current exceeds a certain amount, breakdowns are caused which necessitate interruptions in working; this can only be obviated practically by conducting away the heat, for augmentation of the windings to effect this purpose would be disadvantageous on account of the increased costs of production.

The present invention relates to arrangements of winding in which to obviate the said disadvantages the winding is placed in a separate sheath or casing which is secured in the magnet body in a way that prevents twisting or relative angular movement and at the same time affords a firm hold to the ends of the windings while to facilitate the effective cooling of the winding the external surface of the casing is augmented by channeling.

The accompanying illustrative drawings show electromagnetic clutches with various constructions for attaining the desirable results referred to.

Figure 1 is a longitudinal section of an electromagnetic clutch; and Fig. 2 is a transverse section on the line I—I, Fig. 1.

In the drawing $k$ is one of the clutch members or magnet body, and is mounted upon the shaft $g$; $k'$ is the other clutch member, and is mounted upon the shaft $g'$. Both members carry respectively annular friction members $h$, $h'$ which are drawn together with the clutch members $k$, $k'$ through the action of the current passing through the winding $w$ and coming from brushes $i$ through contact rings $j$. The winding $w$ is fixed to an annular casing $a$ which is provided on its internal face with projections $b$ adapted to fit into corresponding recesses in the magnet body $k$ and thereby prevent relative angular movement or twisting of the casing with the winding when alterations of speed take place or when the clutch is thrown into or out of operation.

The side wall of the casing is provided with pocket like recesses $c$ in which the ends of the windings $w$, which are advantageously constructed in the form of connecting plates, can be arranged well insulated.

Figs. 3, 4 and 5 show in transverse section, elevation and plan respectively, a modified construction, of the arrangement of the winding in which the projections $b$ are hollow and are formed with recesses $c$ at one end so that winding ends comprising connecting plates $d$ of the angle form shown in Figs. 6 and 7 can be conveniently arranged therein without an increase of the winding being necessary.

The connecting plates $d$ are turned over at the top of the vertical side piece, as at $d'$, for the purpose of connecting to the said plates $d$ the two leads $l$ and $l'$ coming from the contact rings $j$ to the winding casing of the magnet body $k$.

The end of the winding $w$, when underneath as shown in Fig. 6, is laid in and soldered to the angle of the connecting plate $d$; while if on top as shown in Fig. 7, it is held in and soldered to the other end of the turned over portion $d'$ of said connecting plate.

Fig. 8 shows a piece of a winding casing $a$ in which the projections $b$ are located on the outer edges of the side walls of the casing.

Figs. 9 and 10 show winding arrangements in which, for the purpose of providing air passages $f$ and obtaining increased outer surface for leading off heat, the casing $a$ is divided into two or more parts, which are arranged next to each other and for which the projections $b$ if desired are common. In this arrangement a part of the winding is laid in each part of the casing.

The ventilation and leading off of heat can be facilitated by dividing up the spaces $f$ between the casings into channels by radial or sloping transverse walls $m$, as shown in Fig. 11 which is a longitudinal section through the casing $a$. In like manner the inner face, as well as the side surfaces of the casing $a$ may be provided with furrows or channels by ribs $n$ running radially or axially or sloping, upon the outside of these surfaces, as shown in Figs. 12 and 13, so as to augment the outer surface of the casing and thereby allow the heat to be rapidly conducted away and ventilation of the winding to be facilitated.

Claims:

1. In electro-magnetic clutches: a magnet body; a winding; an annular, channel-shaped casing adapted to retain said winding; and a locking member or members projecting therefrom, adapted to lock said casing to the magnet body in such a manner as to prevent relative angular movement or twisting of same with respect to said magnet body.

2. In electro-magnetic clutches: a winding; an annular, channel-shaped casing adapted to retain said winding; and pocket like recesses therein adapted to retain the ends of said winding.

3. In electro-magnetic clutches: a winding; an annular, channel-shaped casing adapted to retain said winding; lateral pocket like recesses therein adapted to retain the ends of the said winding; and a locking member or members projecting from said casing.

4. In electro-magnetic clutches: a winding; an annular, channel-shaped casing adapted to retain said winding; lateral pocket like recesses therein; and connecting plates arranged therein and forming the ends of the said winding.

5. In electro-magnetic clutches: a winding; an annular, channel-shaped casing adapted to retain said winding; lateral pocket like recesses therein adapted to retain the ends of the said winding; and means in connection with said casing to promote ventilation of same and assist in the dissipation of the heat.

6. In electro-magnetic clutches: a winding; a series of adjacent, annular, channel-shaped casings adapted to retain said winding, and providing intermediate air spaces; and a locking member or members projecting from said casings.

7. In electro-magnetic clutches: a winding; a series of adjacent, annular channel-shaped casings adapted to retain said winding, and providing intermediate air spaces; a locking member projecting from said casings; and walls in connection therewith adapted to promote ventilation of same and assist in the dissipation of the heat.

8. In electro-magnetic clutches: a winding; a number of adjacent casings adapted to retain said winding; and radial or sloping transverse walls between said casings forming channels, for the purpose of ventilation and dissipation of the heat.

In testimony whereof I have hereunto set my hand in presence of two subscribing witnesses.

HEINRICH AST.

Witnesses:
JOSEF RUBARCH,
ALVESTO S. HOGUE.